(12) United States Patent
Yamamoto

(10) Patent No.: US 6,369,989 B1
(45) Date of Patent: Apr. 9, 2002

(54) SWING ARM FOR MAGNETIC DISC

(76) Inventor: Kazutoshi Yamamoto, 1024-2, Niiyakou, Ozu-shi, Ehime-ken (JP)

( * ) Notice: Subject to any disclaimer, the term of this patent is extended or adjusted under 35 U.S.C. 154(b) by 0 days.

(21) Appl. No.: 09/541,587

(22) Filed: Apr. 3, 2000

(30) Foreign Application Priority Data

May 26, 1999 (JP) ............................................. 11-146803

(51) Int. Cl.[7] ................................................ G11B 5/55
(52) U.S. Cl. ................................................... 360/265.7
(58) Field of Search ........................... 360/265.7, 265.9, 360/266, 266.1

(56) References Cited

U.S. PATENT DOCUMENTS

| | | | | |
|---|---|---|---|---|
| 6,057,989 A | * | 5/2000 | Kaczynski et al. | 360/265.7 |
| 6,185,075 B1 | * | 2/2001 | Tsujino et al. | 360/265.7 |
| 6,236,544 B1 | * | 5/2001 | Hirokawa et al. | 360/265.7 |

* cited by examiner

*Primary Examiner*—Allen Cao
(74) *Attorney, Agent, or Firm*—Jordan and Hamburg LLP

(57) ABSTRACT

The invention disclosed herein provides reduced cost for manufacturing a swing arm for magnetic disc. The swing arm for magnetic disc comprises a plurality of arm members, the arm members comprising a top arm member, at least one or more intermediate arm members, and a lower arm member. Each of the arm members includes a cylindrical portion having large diameter upper and small diameter lower cylindrical portions. The cylindrical portions of the intermediate, and lower arm members include a fitting hole, in which a bearing device is fitted for supporting a spindle, the fitting holes comprising a large diameter bore, and a small bore into which the bearing is fit, respectively. The small diameter cylindrical portions of the top, and intermediate arm members are fitted into the large diameter hole of the intermediate arm members, and the lower arm members, respectively. Thereby, the arm members are connected with each other so that a swing arm for magnetic disc is formed in integrally forming relation of them.

9 Claims, 4 Drawing Sheets

SWING ARM FOR MAGNETIC DISC

THE FIELD OF THE INVENTION

The present invention relates to a swing arm for magnetic disc. More particularly, the present invention relates to a swing arm for magnetic disc, which comprises a plurality of arm members, the arm members being connected together to be integral with each other.

BACKGROUND OF THE PRESENT INVENTION

FIG. 7 is a general oblique view illustrating an embodiment of the swing arm for magnetic disc. The swing arm for magnetic disc is conventional, and complete of the present invention. The swing arm for magnetic disc 11 has an arm portions 11, 12, 22, 32, and a cylindrical portion 42. The cylindrical portion 42 has a fitting hole 41 in which a bearing for supporting a spindle (not shown) is fitted. Thereby, the swing arm for magnetic disc 11 swings about the spindle. The swing arm for magnetic disc 11 has a plurality of arm portions 12, 22, 22, 32 extending forward form the cylindrical portion 42, and formed in spaced relation between its top position and its bottom position, and a movable coil-winding portion 46 arranged on the side opposite from the arms 12, 22, 22, 32 and extending from the side of the cylindrical portion 42. Conventionally, the fitting hole 41, cylindrical portion 42, the plurality of arms 12, 22, 22, 32, and the movable coil-winding portion 46 were integrally formed into a single structural member as the swing arm for magnetic disc 11.

In conventional production of the above swing arm for magnetic disc, firstly, a rough body having arm portions and a cylindrical portion integrally formed therewith and made of material such as aluminum, was fashioned except with the movable coil-winding portion by a combination of die casting and extrusion processes.

After the body with arm and cylindrical portions that were integrally formed, has been rough fashioned, the shape required for the body were machined and finished. Thus, the form of the body with the arm and cylindrical portions was taken on form used as the product.

With the practice described above, expensive machines and tools for cutting were required, and the resultant product cost was also expensive because of required long time for the works. Thus, the conventional swing arm for magnetic disc had inconvenient problems.

SUMMARY OF THE INVENTION

Considering the above problems in the conventional production, the present invention provides a swing arm for magnetic disc, which comprises a plurality of arm members made of metal material, the arm members being assembled with each other in integrally formed relation. The swing arm for magnetic disc can be produced without the cutting work requiring the use of the machines and tools for cutting.

In order to achieve the above objects, the swing arm for magnetic disc provided herein comprises a plurality of arm members connected together to be integral with each other, each of the arm members being made of a metal material, the arm members having a top surface, a bottom surface, an arm portion formed in one side thereof for fixing gimbals, and a cylindrical portion formed in opposite end side from the arm portion, the arm portions being arranged in spaced relation between the up and down positions, the cylindrical portion extending from the top surface of the arm member and protruding downwardly from the bottom surface of the arm member, the cylindrical portion each having a large diameter cylindrical portion and a small diameter cylindrical portion, the large and small diameter cylindrical portions of the arm members each having equal outside diameter to each other, the swing arm for magnetic disc having a top arm member, at least one or more intermediate arm members, and a lower arm member of the arm members, the cylindrical portion of the top arm member having an inside diameter which is of a predetermined distance, the cylindrical portion in the top arm member having the small diameter cylindrical portion which is of a predetermined sleeve length, the intermediate and lower arm member each having a large diameter hole portion, the large diameter hole portion having an inside diameter substantially equal to the outside diameter of the small diameter cylindrical portion of the top arm member, the large diameter cylindrical portion in the intermediate and lower arm members each having a sleeve length substantially equal to the sleeve length of the small diametrical portion of the top arm member, the cylindrical portions of the top, intermediate, and lower arm members each being stepped through the inside diameters of the large and small diameter cylindrical portions to provide a receiver portion thereon, the cylindrical portions of the top arm member having a fitting hole formed in the inside diameter thereof, the intermediate and lower arm members each having a fitting hole extending from the large diameter hole to the end of the small diameter cylindrical portion of the cylindrical portion thereof, the small diameter cylindrical portion of the cylindrical portion of the top arm member being fitted in the large diameter hole of the cylindrical portion in the intermediate arm member, the small diameter cylindrical potion being fitted in the large diameter hole of the cylindrical portion of another intermediate arm member or the lower arm member, the shoulder portion of the cylinder portion of the top, and intermediate arm members contacting with the top surface of another intermediate arm member or the lower arm member, respectively, the lowermost end surface of the cylindrical portions of the top, intermediate, or lower arm members contacting with the receiver portion of the cylindrical portion of another intermediate arm member or the lower arm member, the fitting holes of the cylindrical portions of the top, intermediate, and lower arm members being coupled and communicated with each other so as to be integral with each other.

By virtue of the construction in the above swing arm for magnetic disc, one of the intermediate arm members in the swing arm for magnetic disc can be provided with a holding portion for holding a movable coil portion. It is desired that the holding portion in the swing arm for magnetic disc are freely formed. Preferably, the cylindrical portions each having the fitting hole connected in the assembling relation with each other may be fixedly integrated through resin coating layer on the periphery thereof, the resin coating layer being applied into the desirable shape.

THE PREFERRED EMBODIMENT OF THE INVENTION

Figure 1:
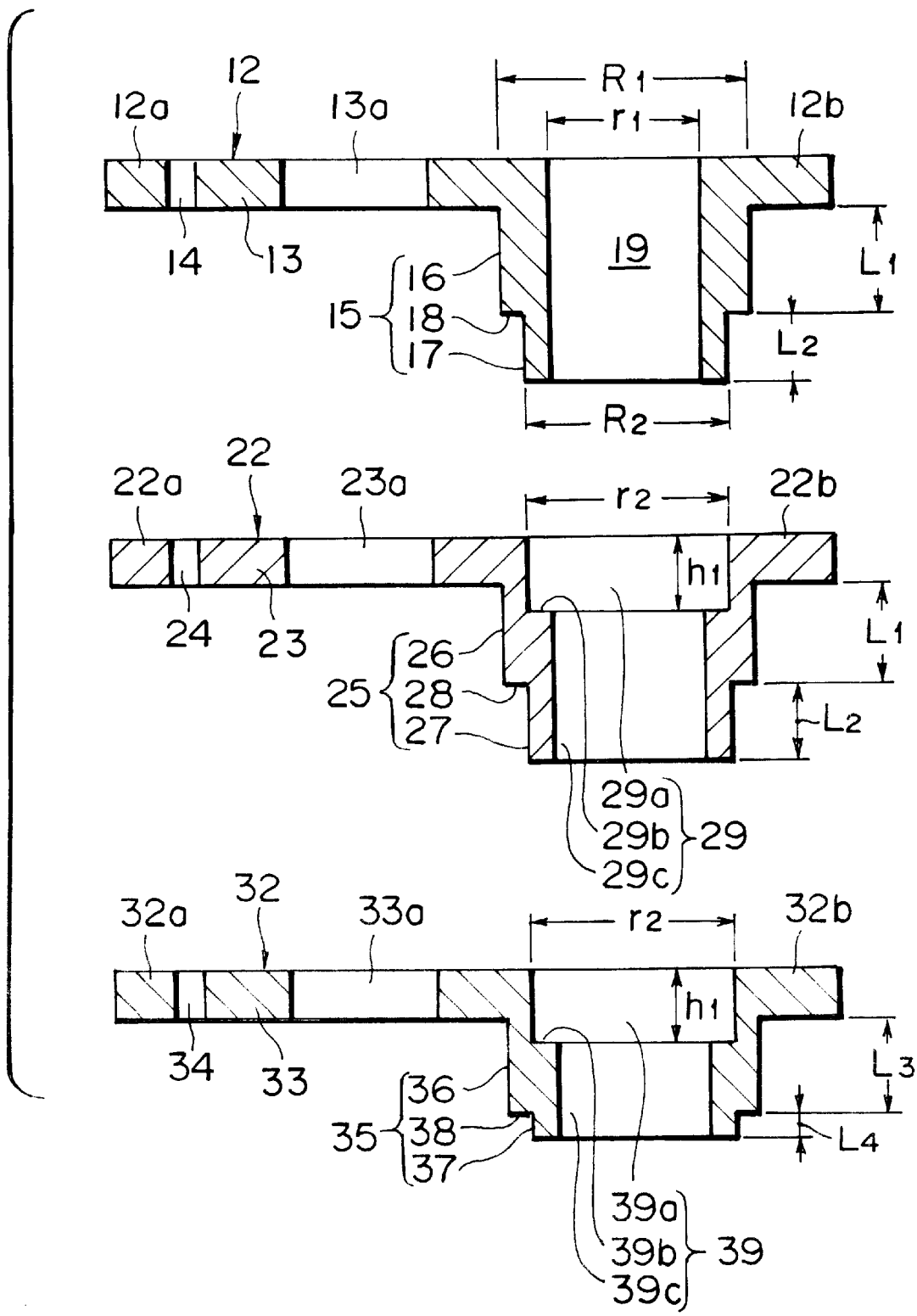
FIG. 1 is a vertically sectional view showing components of a swing arm for magnetic disc according to the invention.

Referring to FIG. 1 as an example of the present invention, there is illustrated a swing arm for magnetic disc 11, which is taken apart and sectioned. The swing arm for magnetic disc 11 comprises three armed members of a top arm member 12, an intermediate arm member 22 and a lower arm member 32. The top, intermediate, and lower arm members 12, 22 and 32 have arm portions 13, 23 and 33, and a cylindrical portions 15, 25, and 35 formed at adjacent to proximal ends 12b, 22b and 32b therein and extending downwardly therefrom. It should be observed that a number of the intermediate arm member 22 is not limited.

Figure 6:
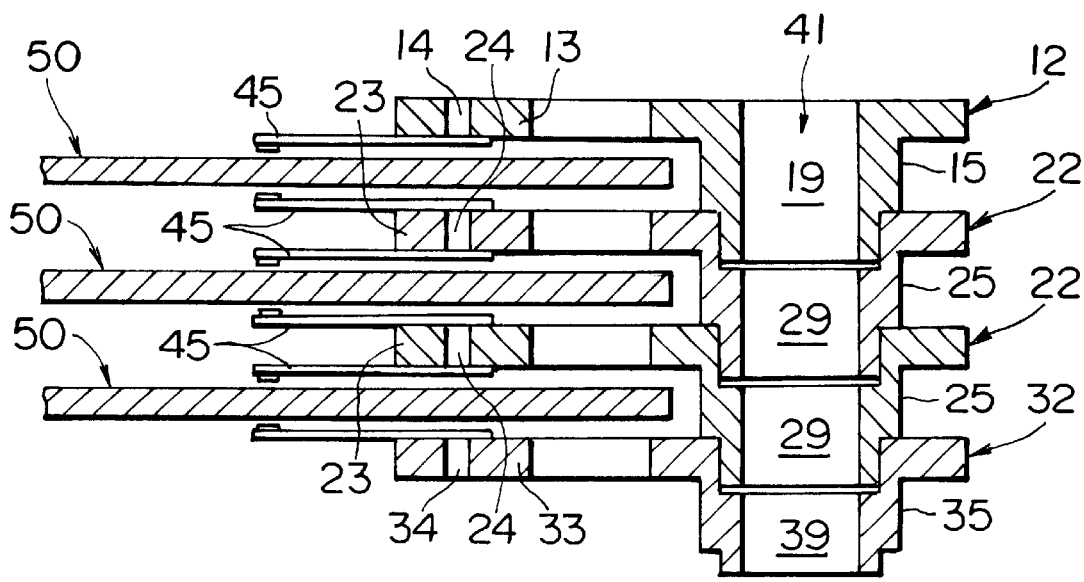
FIG. 6 is a view depicting an arrangement of media, magnetic discs, for example, in relationship with the swing arm according to the present invention.
Figure 7:
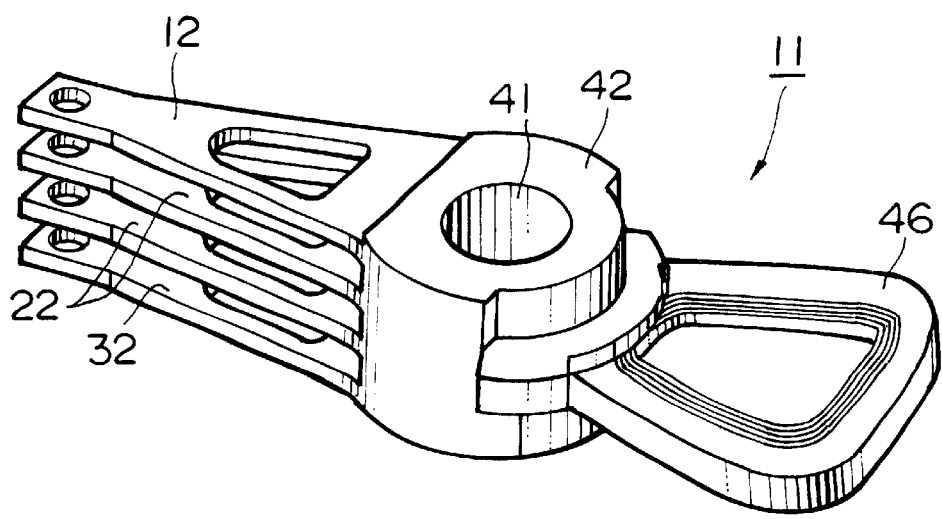
FIG. 7 is a view depicting a conventional swing arm for magnetic disc (including a depiction of the swing arm for magnetic disc according to the present invention).

The arm portions 13, 23 and 33 of the top, intermediate and lower arm members have a cutout opening 13a, 23a, and 33a for losing weight so that the inertia is reduced with respect to the weight of the arm members, and circular holes 14, 24, and 34 formed near its distal end. The circular holes 14, 24, and 34 are adapted to secure gimbals 45 to the arm portions 13, 23 and 33, respectively, as shown in FIG. 6. Each of the gimbals 45 forwardly extends outward from leading end 12a, 22a, and 32a of the arm portions 13, 23, and 33. In addition, the arm portions 13, 23 and 33 are desired to gently taper off so that the inertia is reduced for the purpose of lightened weight. As the need arises, the arm portions 13, 23 and 33 may be formed in same width without applying the taper.

The cylindrical portions 15, 25 and 35 of the top, intermediate and lower arm members 12, 22 and 32 have upper cylindrical portions 16, 26 and 36 having larger diameter, and lower cylindrical portions 17, 27, and 37 having smaller diameter, respectively. The small diameter lower cylindrical portions 17, 27, and 37 each integrally extend from a bottom surface of the large diameter upper cylindrical portions 16, 26, and 36 so that stepped portions 18, 28, and 38 are formed between outside surfaces of respectively, the large diameter upper cylindrical portions 16, 26 and 36 and the small diameter lower cylinder portions 17, 27, and 37 integrally extending downwardly from the bottom surface, of respectively, the large diameter upper cylindrical portions 16, 26, and 36.

Figure 3:
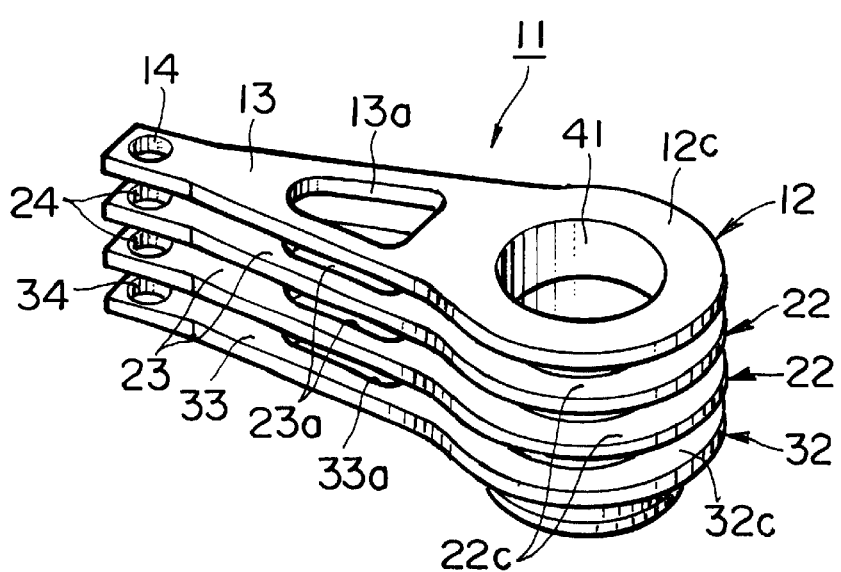
FIG. 3 is a whole perspective view showing a first embodiment of the swing arm for magnetic disc according to the present invention as a whole.

Each of the stepped portions are formed perpendicular to the side of the cylindrical portions 15, 25, and 35. The arm portions 13, 23, and 33 have larger width than the diameter of the cylindrical portions 15, 25, and 35. Thereby, the swing arm for magnetic disc 11 is provided with brim shaped portions 12c, 22c, and 32c integrally formed into respectively, the arm members 12, 22, and 32, and protruding externally and horizontally with respect to a top plane surface of the cylindrical portions 15, 25, and 35, as shown in FIG. 3.

The description now will be made in relationship with the top, intermediate and lower arm members 12, 22, and 32 formed individually in different shapes.

It will be understood from FIG. 1 that the large diameter upper cylindrical portion 16 has an outside diameter $R_1$, and an inner diameter $r_1$, while the small diameter lower cylindrical portion 17 has an outside diameter $R_2$ which is of value less than that of the outer diameter $R_1$ of the large diameter upper cylindrical portion, and an inside diameter $R_2$. Therefore, the cylindrical portion 15 of the top arm member 12 has an inside surface extending from the brim shaped portion 15 to the small diametrical lower cylindrical portion 17 and formed with same diameter.

The top arm member 12 has a fitting hole 19 in which a bearing device for supporting a spindle is fitted (not shown), the fitting hole 19 extending between the top surface and the end of the small diameter lower cylindrical portion 17 of the top arm member 12. Furthermore, $L_1$ denotes a first length of a sleeve between the back surface on the opposite side to the top surface and the lowermost end surface of the large diameter upper cylindrical portion 16 of the top arm member 12, and $L_2$ denotes a second length of a sleeve between the stepped portion 18 and the lowermost end surface of the small diametrical lower cylindrical portion 17.

The intermediate arm member 22 also has same profile in section as that of the top arm member 12. The large diameter upper cylindrical portion 26, and the small diameter lower cylindrical portion 27 of the intermediate arm member 22 comprises the first and second sleeve lengths $L_1$ and $L_2$, respectively, similarly to the top arm member 12. The large diameter upper cylindrical portion 26, and the small diameter lower cylindrical portion 27 have sides formed with the outside diameters $R_1$ and $R_2$, respectively, similarly to the top arm member 12.

However, the cylindrical portion 25 of the intermediate arm member 22 has inside shape different than that of the cylindrical portion 15 of the top arm member 12. The inside shape comprises a large hole 29a with larger diameter, and a small hole 29c with smaller diameter. The large diameter hole 29a is of a second inside diameter $r_2$ that is sized to allow the small diameter lower cylindrical portion 17 of the top arm member 12 to be fitted therewith, specifically, including $R_2 \geq r_2$ or $R_2 < r_2$, and depth $h_1$ having a length substantially equal to the sleeve length $L_2$ of the small diameter lower cylindrical portion 17, specifically, $L_2 \leq h_1$. The small diameter hole 29c extends from the lower end of the large diameter upper cylindrical portion 26 to the lower end of the small diameter upper cylindrical portion 27, thereby a receiver portion 29b of the cylindrical portion 25 is formed through a plane surface extending from the lowermost end of the large diameter hole 29a to the top end of the small diameter hole 29c. Thus, the large diameter hole 29a or the receiver portion 29b, and the small diameter hole 29c form the fitting hole 29 in which a bearing device for supporting a spindle is fitted.

Furthermore, the cylindrical portion 35 of the lower arm member 32 also has the large diameter upper cylindrical portion 36, the small diameter lower cylindrical portion 37, and the stepped portion 38, but the lower arm member 32 doesn't have the same profile in section as that of the top arm member 12. The cylindrical portion 35 has the large diametrical upper cylindrical portion 36 which is of the outside diameter $R_1$, and the small diametrical lower cylindrical portion 37 which is of the outside diameter $R_2$, similarly to the cylindrical portion 15 of the top arm member 12.

However, the large diameter upper cylindrical portion 36 of the cylindrical portion 35 has a sleeve length $L_3$ having the same or slightly short length relative to the sleeve length $L_1$ of the large diameter upper cylindrical portion 16 of the top arm member 12. In addition, the small diameter lower cylindrical portion 37 of the cylindrical portion 35 has a sleeve length $L_4$ having a short length relative to the sleeve length $L_2$ of the small diameter lower cylindrical portion 17 of the top arm member 12.

Moreover, the large diameter upper cylindrical portion 36 has an inside diameter $r_2$ sized to allow the small diameter lower cylindrical portion 17 with the outside diameter $R_2$ to be fitted therewith, specifically, including $R_2 \geq r_2$ or $R_2 < r_2$, and a depth $h_1$ having substantially the same length relative to the sleeve length $L_2$ of the small diameter lower cylindrical portion 17, specifically, $L_2 \leq h_1$. The lower arm member 32 has a fitting hole 39, which comprises a large diameter hole 39a with the depth $h_1$ of the large diameter upper cylindrical portion 36, a small diameter hole 39c of the small diameter lower cylindrical portion 37 integrally extending from the large diameter upper cylindrical portion 36 to the end thereof, and a receiver portion 39b formed on a plane surface laterally extending from the lower end of the large diameter hole 39a to the top end of the small diameter hole 39c.

According to the present invention, the swing arm for magnetic disc 11 is constructed with a top arm member 15, two intermediate arm members 25, and a lower arm member 35, as illustrated in FIG. 6. Four arm members of the swing arm for hard disc 11 are arranged by use of three media 50 such as a magnetic disc. As described above, the number of the intermediate arm member 22 of the swing arm for hard disc 11 is not limited. For example, if six media are used, five intermediate arm members 25 may be provided.

Figure 2:
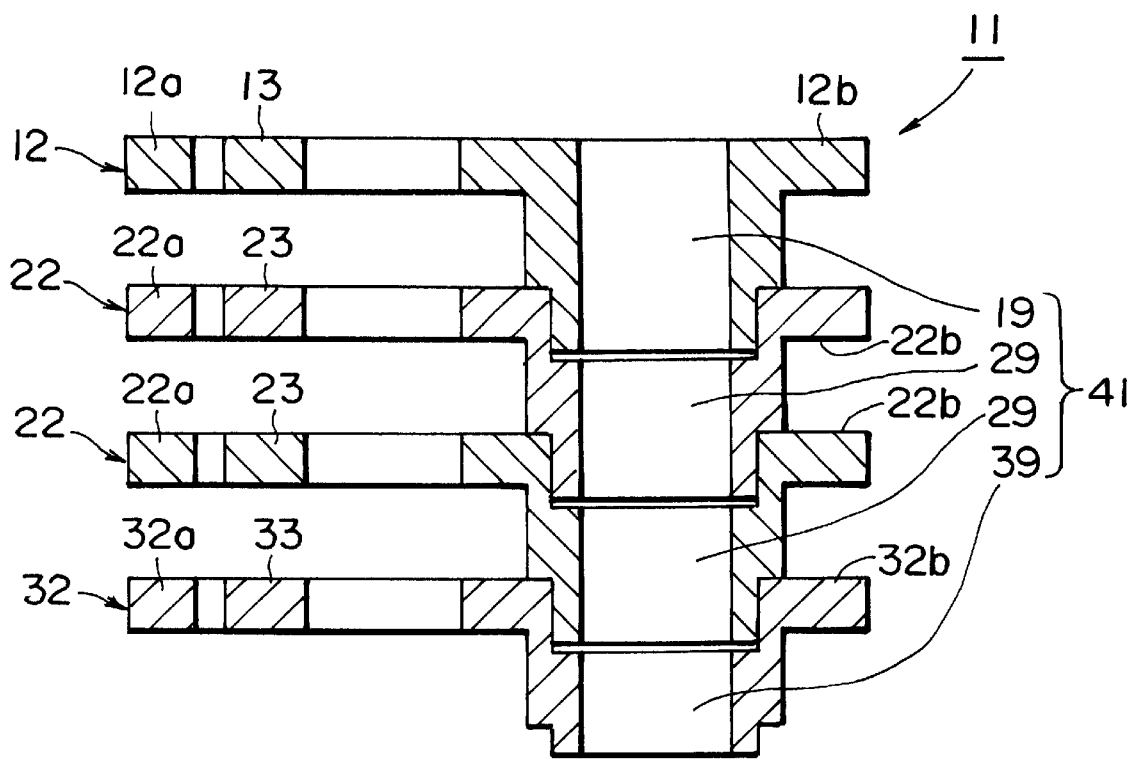
FIG. 2 is a vertically sectional view showing a first embodiment of a swing arm for magnetic disc according to the invention.

In assembling the top, intermediate, and lower arm members 12, 22, and 32, the swing arm for hard disc 11 according to the present invention is illustrated in FIGS. 2, and 3 showing a perspective view of FIG. 2.

The top, intermediate, and lower arm members 12, 22, and 32 are separately produced by a lightweight metal material such as aluminum, for example, the lightweight metal material being drawn at the cold worked forging process.

The description now will be made in relationship with the assembly of the arm members, as illustrated in FIGS. 1 and 2. The arm members may be assembled in random order. In accordance with the embodiment, the performed assembly will be described in order of the top arm member 12 to the lower arm member 32.

Firstly, the small diameter lower cylindrical portion 17 of the cylindrical portion 15 of the top arm member 12 is inserted into the large diametrical hole 29a of the bearing hole 29 of the cylindrical portion 25 of the first intermediate arm member 22, the first intermediate arm member 22 being arranged below and adjoining to the top arm member 12, such that the stepped portion 18 of the top arm member 15 contacts with the top surface of the first intermediate arm member 22 so that the stepped portion 18 is held.

Upon the completed insertion of the small diameter lower cylinder portion 17, the top arm member 15 is connected with the first intermediate arm member 25, such that the arm portion 13 of the top arm member 15 is arranged or positioned above the arm portion 23 of the first intermediate arm member 25.

As indicated above, the relationship between the outer diameter $R_2$ at the small diameter lower cylindrical portion 17 of the top arm member 12 and the inner diameter $r_2$ of the large diameter hole 29a of the first intermediate arm member 22 is $R_2 \geq r_2$ or $R_2 < r_2$. If $R_2 \geq r_2$, the small diameter lower cylindrical portion 17 has to be pressed into the large diameter hole 29a. If $R_2 < r_2$, the small diameter lower cylindrical portion 17 can be easily connected with the large diameter hole 29a.

It should be observed that if $R_2 < r_2$, a gap arises between the outside surface of the small diameter lower cylindrical portion 17 and the inside surface of the large diameter hole 29a. The gap causes the small diameter lower cylindrical portion 17 to be displaced the large diameter hole 29a. Therefore, the gap should be filled up with resin molding. Resultantly, the top arm member 12 is integrally formed with the first intermediate arm member 22.

Secondly, the small diameter cylindrical portion 27 of the first intermediate arm member 22 combining with the top arm member 12 is connected with a large diameter hole 29a of a second intermediate arm member 22, until that the top surface of the second intermediate arm member 22 has contacted with the stepped portion 28 of the first intermediate arm member 22 for holding the small diameter cylindrical portion 27 of the first intermediate arm member 22.

Thirdly, the small diameter cylindrical portion 27 of the second intermediate arm member 22 connecting with the first intermediate arm member 22 is fitted into the large diameter hole 39a of the lower arm member 32, until that the top surface of the lower arm member 32 has contacted with the stepped portion 28 in the second intermediate arm member 22 for holding the small diameter cylindrical portion 27 of the second intermediate arm member 22.

After the assembly and the integral form of the top, first, and second intermediate arm members 12, 22, 22, the small diameter cylindrical portion 27 of the second intermediate arm member 22 is fitted into the large diametrical hole 39a formed in the fitting hole 39 of the cylinder portion 35 of the lower arm member, until the stopped portion 28 of the second intermediate arm member 22 has contacted with the top surface of the lower arm member 32.

In fitting the small diameter lower cylinder portions 27, 37 into the large diameter holes 29a, 39a of the fitting holes 25, 35, respectively, the relationship between the outer diameter $R_2$ and the inner diameter r2 is $R_2 \geq r_2$ or R2<r2. If $R2 \geq r2$, the small diameter lower cylindrical portions 27, 37 has to be pressed into the large diametrical holes 29a, 39a, respectively. If $R_2 < r_2$, the small diameter lower cylindrical portions 27, 37 can be easily fitted in the large diameter holes 29a, 39a, respectively.

As described in relationship with the top arm member 12 integrally formed with the first intermediate arm member, the arrangement of the arm portions 23, 33 is such that one arm portion is located parallel to another arm portion at same position between up and down positions. At this time, the first and second intermediate, and lower arm members 22, 32 are connected with each other.

Referring to FIG. 3, the top, first and second intermediate, and lower arm members 12, 22, 22, 32 are shown in the assembled relationship. The top, first and second intermediate, lower arm members 12, 22, 22, 32 are connected with each other, and the arm portions 13, 23, 23, 33 are arranged in spaced relationship to each other at a predetermined equal interval, as shown in FIG. 2.

Figure 4:
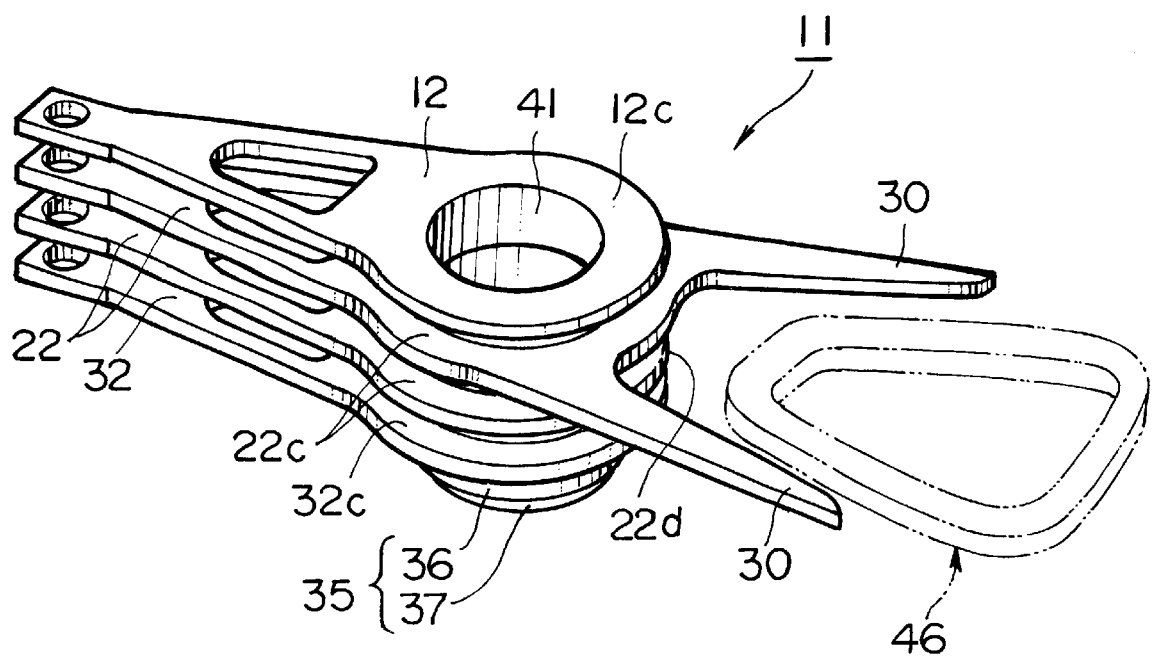
FIG. 4 is a whole perspective view showing a second embodiment of a swing arm for magnetic disc according to the present invention.

FIG. 4 is a whole perspective view showing a second embodiment of the swing arm for magnetic disc, in which either of the intermediate arm members 22 is formed different than that of the embodiment described above. According to the drawing illustrated herein, an intermediate arm member 22 at its upper position is of different form. As shown in FIGS. 3, 4, a pair of inverted V support portions 30, 30 are integrally formed in the intermediate arm member 22, and protrudes from its proximal end near the fitting hole 41 on the opposite side to the arm portion 23 of the intermediate arm member 22. The support portions 30, 30 serve to support a moving coil element 46 in combination with the adhesive and so on as applied thereon.

Figure 5:
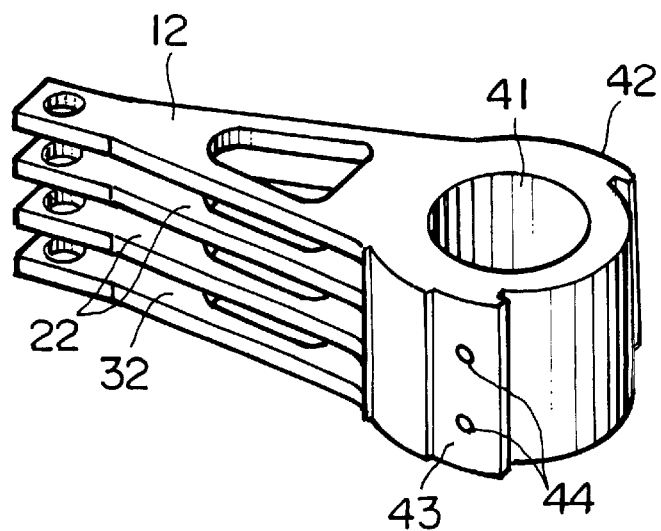
FIG. 5 is a whole perspective view showing a third embodiment of a swing arm for magnetic disc according to the present invention.

FIG. 5 is a perspective view showing a third embodiment of the swing arm for magnetic disc according to the present invention. As shown in FIGS. 1, 2, 5, resin molding is applied over the outside surface of the large diameter upper cylindrical portions 16, 26, 26, 36. As described above, the cylindrical portions 15, 25, 35 each are centrally arranged near its proximal ends 12b, 22b, 32b opposite to the arm portions 13, 23, 33. Thereby, the brim shaped portions 12c, 22c, 32c protruding from the outside surface of respectively, the large diameter upper cylindrical portions 16, 26, 56, 36, are formed.

The brim shaped portions 12c, 22c, 32c in combination with the large diameter upper cylindrical portions 16, 26, 36 provide spaces to allow the resin to flow thereto and securely adhere thereon, whereby coated resin layer 42, as shown in FIG. 5, is produced.

Preferably, the coated resin layer 42 comprises a resin material such as a thermoplastic resin with heat resistance, a polyphenylene sulfide (P.P.S.) resin, a liquid crystal polymer (L.C.P.) resin, and a polyimide (P I) resin, and so on. If necessary, a reinforcing filler may be added in the resin materials applied to the coated resin layer.

Therefore, the top, first and second intermediate, and lower arm members 12, 22, 22, 32 are firmly and preferably integrated into the assembled swing arm for magnetic disc 11. The assembled swing arm for magnetic disc 11 provides a fitting hole 41 extending between the fitting hole 19 of the top arm member 12 and the fitting hole 39 of the lower arm member 32.

The coated resin layer 42 is stepped at positions on the opposite sides of the swing arm for magnetic disc 11 to provide mounting surfaces 43, 43 at the lowed portions for mounting an electric circuit, not shown. The mounting surfaces 43, 43 each have one or more mounting apertures 44, 44 into which mounting members of the electric circuit are mounted.

As above described, in accordance with the present invention, it is possible to produce a swing arm for magnetic disc without machining work in which expensive machines and appliances are utilized. Because the top, intermediate, and lower arm members separately formed, are assembled and integrated into the swing arm for magnetic disc through the cylindrical portions thereof. Therefore, it will be understood that the present invention provides effective reduction in the product cost of the swing arm for magnetic disc.

Furthermore, when either of the intermediate arm members has a pair of V inverted support portions horizontally protruding from its proximal end on the opposite side to the arm potion, the swing arm for magnetic disc allows holding of the movable coil through the support portions.

Moreover, when the resin molding is applied to the outer surface of the cylindrical portions in the upper, intermediate, and lower arm members integrally formed into the swing arm for magnetic disc such that the coated resin layer take a desired form, preferable and firm integration of the arm member is permitted.

What is claimed is:

1. A swing arm for a magnetic disc drive having a plurality of arms on which gimbals is secured, said swing arm for said magnetic disc drive comprising a plurality of arm members, said swing arm for said magnetic disc drive comprising:

an upper arm member having an arm portion on which gimbals is secured, a cylindrical potion formed near its proximal end, the cylindrical portion comprising a large diameter upper cylindrical portion having a sleeve which is of length $L_1$, and outside diameter of $R_1$, a small diameter lower cylindrical portion having a sleeve which is of length $L_2$ and outside diameter of $R_2$, a stepped portion, and a fitting hole in which a bearing device is fitted for supporting a spindle, the fitting hole having inside diameter of $r_1$:

at least one or more intermediate arm member having an arm portion on which gimbals is secured, and a cylindrical portion formed near its proximal end, the cylindrical portion comprising a large diameter upper cylindrical portion having a sleeve which is of length $L_1$, and outside diameter of $R_1$, a small diameter lower cylindrical portion having a sleeve which is of length $L_2$, and outside diameter of $R_2$, a stepped portion, and a fitting hole in which a bearing device is fitted for supporting a spindle, the fitting hole comprising a large diameter hole, a small diameter hole, the large diameter hole being of depth $h_1$ substantially equal to length of the sleeve of the small diameter cylindrical portion of the upper arm member, the small diameter hole being of inside diameter $r_2$ larger than inside diameter $r_1$ of the cylindrical portion of the upper arm portion, and a receiver portion for receiving the small diameter cylindrical portion of the cylindrical portion of said upper arm member; and a lower arm member having an arm portion on which gimbals is secured, and a cylindrical portion formed near its proximal end, the cylindrical portion comprising a large diameter upper cylindrical portion having a sleeve which of length $L_3$, substantially equal to or less than the length of the sleeve of the cylindrical portion of said intermediate arm member, and outside diameter $R_1$, a small diameter lower cylindrical portion having a sleeve which of length $L_4$ less than the length $L_2$ of the cylindrical portion of the upper arm member or intermediate arm member, and an outside diameter $R_2$, a fitting hole in which a bearing device is fitted for supporting a spindle, the fitting hole having a large diameter hole portion which is of depth $h_1$ substantially equal to the small diameter lower cylindrical portion of said upper arm member or lower arm member, and a small diameter hole portion which is of inside diameter $r_1$, and a receiver portion for receiving the small diameter lower cylindrical portion of said upper arm member or lower arm member, whereby said upper arm member, intermediate arm member, and lower arm member is assembled to be integrally formed such that a swing arm for said magnetic disc drive is formed, and fitting holes of said upper arm member, intermediate arm member, and lower arm member.

2. The swing arm for said magnetic disc drive defined in claim 1, said swing arm for said magnetic disc drive further comprising: said intermediate arm member having a pair of holding portions, the holding portions vertically protruding from the side face of the cylindrical portion at the proximal end on the opposite side to the arm portion, the holding portion being shaped to hold a movable coil member.

3. The swing arm for said magnetic disc drive defined in claim 1, wherein a resin coating is applied to said cylindrical portions of the top arm member, the intermediate arm member, and the lower arm member that are integrally connected with each other, said fitting hole passing from said top arm member to said lower arm member through said intermediate arm member, the resin coating layer produced by the resin coating is formed into a desired shape so that the top arm member, the intermediate arm member, and lower arm member are fixedly integrated.

4. The swing arm for said magnetic disc drive defined in claim 1, wherein when the small diameter lower cylindrical portion of the cylindrical portion of the top arm member or intermediate arm member is slightly larger in the outside diameter than the inside diameter of the large diameter hole of the cylindrical portion of the intermediate arm member or lower arm member, the small diameter lower cylindrical portion of the cylindrical portion of the top arm member or intermediate arm member is pressed into the large diameter hole of another intermediate arm member or said lower arm member.

5. The swing arm for said magnetic disc drive defined in claim 2, wherein when the small diameter lower cylindrical portion of the cylindrical portion of the top arm member or intermediate arm member is slightly larger in the outside diameter than the inside diameter of the large diameter hole of the cylindrical portion of the intermediate arm member or lower arm member, the small diameter lower cylindrical portion of the cylindrical portion of the top arm member or intermediate arm member is pressed into the large diameter hole of another intermediate arm member or said lower arm member.

6. The swing arm for said magnetic disc drive defined in claim 3, wherein when the small diameter lower cylindrical portion of the cylindrical portion of the top arm member or intermediate arm member is slightly larger in the outside diameter than the inside diameter of the large diameter hole of the cylindrical portion of the intermediate arm member or lower arm member, the small diameter lower cylindrical portion of the cylindrical portion of the top arm member or intermediate arm member is pressed into the large diameter hole of another intermediate arm member or said lower arm member.

7. The swing arm for said magnetic disc drive defined in claim 1, wherein when the small diameter lower cylindrical portion of the cylindrical portion of said top arm member or said intermediate arm member is smaller in the outside diameter than the inside diameter of the large diameter hole of the cylindrical portion of said intermediate arm member or said lower arm member, a gap between the outside surface of the cylindrical portion of said top arm member or said intermediate arm member, and the inside surface of the cylindrical portion of said intermediate arm member or said lower arm member is filled with a resin material.

8. The swing arm for said magnetic disc drive defined in claim 7, wherein a resin coating is applied to said cylindrical portions of the top arm member, the intermediate arm member, and the lower arm member that are integrally connected with each other, said fitting hole passing from said top arm member to said lower arm member through said intermediate arm member, the resin coating layer produced by the resin coating is formed into a desired shape so that the top arm member, the intermediate arm member, and lower arm member are fixedly integrated.

9. The swing arm for said magnetic disc drive defined in claim 7, wherein when the small diameter lower cylindrical portion of the cylindrical portion of the top arm member or intermediate arm member is slightly larger in the outside diameter than the inside diameter of the large diameter hole of the cylindrical portion of the intermediate arm member or lower arm member, the small diameter lower cylindrical portion of the cylindrical portion of the top arm member or intermediate arm member is pressed into the large diameter hole of another intermediate arm member or said lower arm member.

* * * * *